United States Patent [19]

Greene et al.

[11] Patent Number: 5,075,273
[45] Date of Patent: Dec. 24, 1991

[54] CATALYST FOR DESTRUCTION OF HAZARDOUS CHORINATED WASTES AND PROCESS FOR PREPARING THE CATALYST

[75] Inventors: Howard L. Greene, Mogadore; Harry M. Cheung, Hudson; Roger S. Danals, Broadview Heights; Sanjay V. Vimawala, Akron, all of Ohio

[73] Assignee: University of Akron, Akron, Ohio

[21] Appl. No.: 442,063

[22] Filed: Nov. 28, 1989

[51] Int. Cl.$^5$ .......................... B01J 21/04; B01J 21/08; B01J 23/04; B01J 27/08

[52] U.S. Cl. ..................................... 502/231; 502/224

[58] Field of Search ................ 502/224, 231, 344, 353

[56] References Cited

U.S. PATENT DOCUMENTS

| | | | |
|---|---|---|---|
| 1,941,426 | 12/1933 | Beardsley et al. | 502/224 X |
| 2,209,908 | 7/1940 | Weiss | 502/344 X |
| 2,912,300 | 11/1959 | Cannon et al. | 23/2 |
| 2,942,933 | 6/1960 | Batchelder et al. | 23/2 |
| 3,025,132 | 8/1959 | Innes | 23/2 |
| 4,330,513 | 5/1982 | Hunter et al. | 423/245 |

OTHER PUBLICATIONS

Novella, et al., An. Quim. 1978, 74(1), 150-6 (Span) [Chem. Abstracts, vol. 89: 146146M, 1978].
Sun, et al., Ranliao Huaxue Xuebao 1984, 12(1), 48-54 (China) [Chem. Abstracts, vol. 101:25362M, 1984].

*Primary Examiner*—W. J. Shine
*Attorney, Agent, or Firm*—Oldham & Oldham Co.

[57] ABSTRACT

New alkali metal salt vanadium oxide catalysts have been prepared for the oxidation of chlorinated hydrocarbons. The new catalyst can be supported or unsupported and show excellent activity, selectivity, and resistance to common sulfur containing poisons. The new catalyst can have composition ranging from 1:0.05 alkali metal salt to vanadium ratio to 1:5 alkali metal salt to vanadium ratio. The catalyst operates at moderate temperature from about 300° C. to 600° C. with no apparent loss of vanadium.

16 Claims, 4 Drawing Sheets

CATALYST FOR DESTRUCTION OF HAZARDOUS CHORINATED WASTES AND PROCESS FOR PREPARING THE CATALYST

TECHNICAL FIELD

This invention relates to a catalyst composition comprising oxides of vanadium and an alkali metal salt for the selective deep oxidation of hazardous chlorinated organics, a process for making said catalyst and a process for the selective deep oxidation of hazardous chlorinated organics which comprises burning chlorinated organics in the presence of said catalyst and excess oxygen. These new catalysts can be supported on a variety of supports including inorganic supports such as aluminum oxide, silica, silicates, cordierite and other similar supports and combination thereof.

More specifically, this invention relates to a composition for oxidizing hazardous chlorinated hydrocarbons including volatile chlorinated hydrocarbons and less volatile polychlorinated aromatic hydrocarbons with oxygen, preferably in excess, in the presence of a catalyst mixture of a potassium metal salt, particularly a potassium halide salt and an oxide of vanadium which is preferentially deposited on a support.

BACKGROUND ART

Chlorinated hydrocarbons including polychlorinated biphenyls (PCB's) and volatile chlorinated hydrocarbons represent considerable health and environmental risks. Their destruction normally requires fairly high temperature oxidation in the presence of a supported catalyst such as chromium oxide supported on alumina or other types of supports. Hunter et al. U.S. Pat. No. 4,330,513 has reported a process using a particular type of reactor design and chromium oxide catalyst deposited on alumina for a procedure for burning catalytically chlorinated hydrocarbons including PCB's. His apparatus requires a continuously fluidized bed of catalytic particles and is accomplished at temperatures ranging between 900° F. and 1400° F. (468° C.-745° C.

Vanadium oxide catalysts have been used in a variety of catalytic processes for further combustion of hydrocarbon exhaust gases. In particular, vanadium oxide has been used in catalytic converters for automobiles as an alternative to the platinum catalyst which is commonly used today. In those situations the vanadium catalyst is deposited on supports and the hot exhaust gases are allowed to pass over the vanadium catalyst in the presence of excess oxygen to promote oxidation of the hydrocarbons to water and carbon dioxide. Cannon et al., U.S. Pat. No. 2,912,300 disclosed an ammonium metavanadate catalyst supported on an aluminia support for the oxidation of effluent exhaust gases from internal combustion engines. Batchelder et al. U.S. Pat. No. 2,942,933 has also reported the use of vanadium catalysts for the oxidation of carbon monoxide to carbon dioxide in exhaust gases. Likewise, Innes, U.S. Pat. No. 3,025,132 has disclosed use of supported vanadium catalysts for the oxidation of effluent gases.

All these applications using vanadium catalysts in the field of automotive exhaust emission control require temperatures in the range of 100°-200° C. This is a practical limit for a vanadium oxide supported catalyst in that these types of catalyst coatings become volatile and/or reactive at temperatures above 300° C. and volatize at temperatures above 500° C. In fact, in the presence of hydrochloric acid (HCl) or chlorine ($Cl_2$), the vanadium catalysts will lose vanadium as a volatile vanadium compound such as $VOCl_3$. It should also be noted that the oxidation of chlorinated hydrocarbons is normally performed at temperatures considerably higher than a vanadium catalyst could withstand without volatization.

It thus appears desirable to have not only a low temperature process for the deep oxidation of chlorinated hydrocarbons, but also to have a stabilized form of vanadium oxide with low volatility to accomplish this type of oxidation. This type of catalytic environment would not only represent a major advancement in the destruction of noxious chlorinated hydrocarbons such as chlorinated biphenyl, but also for most of the low molecular weight, highly volatile chlorinated hydrocarbons used as industrial solvents.

DISCLOSURE OF INVENTION

It is an object of this invention to provide a novel, low volatility, highly selective, highly active, highly stable, poison resistant catalyst for the deep oxidation of hazardous chlorinated hydrocarbons based on a mixture of an alkali metal salt, preferably a potassium salt and particularly a potassium halide, and an oxide of vanadium.

A further object of this invention is to provide a novel, low volatility, highly selective, highly active, highly stable, poison resistant catalyst for the deep oxidation of hazardous chlorinated hydrocarbons based on a mixture of a alkali metal salt, preferably a potassium salt and particularly a potassium halide, and an oxide of vanadium supported on an inorganic support.

A further object of this invention is to provide a process for manufacturing the catalysts of the present invention.

A further object of this invention is to provide a low temperature process for the deep oxidation of chlorinated hydrocarbons based on the novel catalyst of this invention.

The novel catalysts of the present invention comprise a mixture of an alkali metal salt with an oxide of vanadium and are preferably supported on supports such as inorganic oxides including, but not restricted to: alumina, silica silicates, cordierite, silica-aluminas or other similar inorganic oxides. However, new high temperature organics can also be used as supports.

The novel catalysts of the present invention are manufactured according to the following process: contacting an alkali metal salt with a vanadium oxide precursor preferably in an aqueous medium in a molar ratio from about 7:0.5 to 1:5. The mixture is then thermally dried at a temperature from about 85° C.-100° C. and calcined at temperatures from about 300° C. to 600° C. This first type of catalyst could be used in a gas-molten salt type reactor.

A second and preferable manufacturing process for the catalyst of the present invention involves contacting an alkali metal salt with a vanadium oxide precursor preferably in an aqueous medium in a molar ratio from about 1:0.5 to 1:5 in the presence of an inorganic support. The mixture is then thermally dried at a temperature from about 100° C. to 160° C. and calcined at temperatures from about 300° C. to 600° C. This preferred process for manufacturing the catalyst of this invention is designed to allow for complete and careful solution deposition of the catalyst onto an inorganic or high temperature organic support.

The process for destruction of chlorinated hydrocarbons involves contacting a chlorinated hydrocarbon with a catalyst of an alkali metal salt and an oxide of vanadium in a molar ratio from about 1:0.5 to 1:5 at a temperature from about 300° C. to 600° C. in any type of commercial reactor or furnace for a sufficient time to allow for oxidation from about 0.001 seconds to 5 seconds.

BEST MODE FOR CARRYING OUT THE INVENTION

Figure 1:
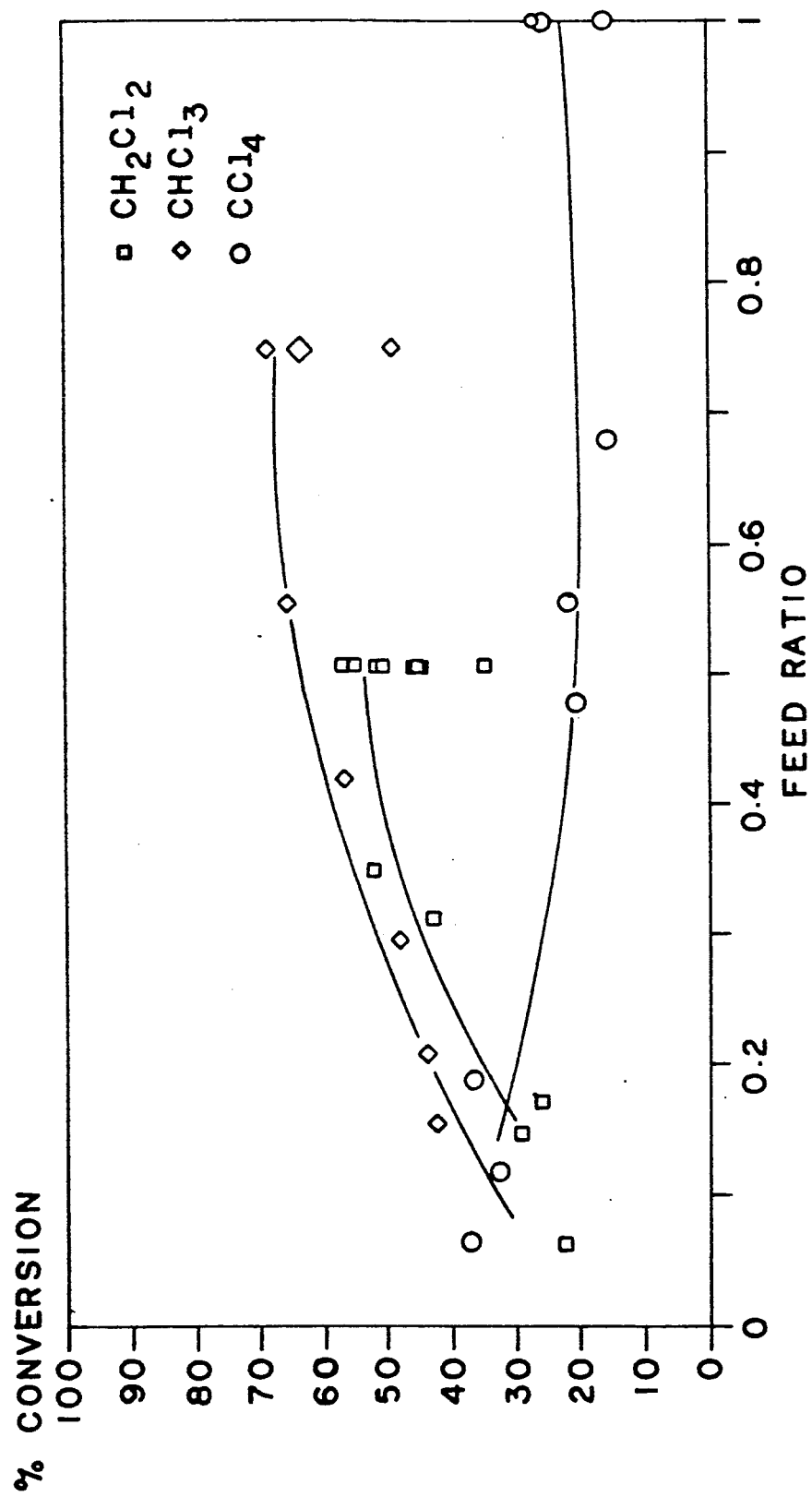
FIG. 1 represents the conversion profiles for these chlorinated methanes, dichloromethane, chloroform and carbon tetrachloride, versus the feed ratio (the number of carbon chlorine bonds in the feed divided by the number of carbon chlorine bonds plus the number of hydrogen atoms in the feed). The conversion profiles are distinguished by the use of three different markers described in the legend to FIG. 1.

Applicants have found that the potassium chloride vanadium oxide catalysts of the present invention represent a new class of poison resistant, active, highly selective catalyst for the deep oxidation of chlorinated hydrocarbons. This catalyst system is usable for a wide variety of chlorinated hydrocarbons including volatile chlorinated hydrocarbons such as methylene chloride, chloroform, carbon tetrachloride, trichlorinated benzenes and PCB's. The potassium chloride stabilized vanadium oxide catalyst allows catalysis to be performed at temperatures in the range from about 300°-600° C. without loss in catalyst due to volatilization. This catalytic system has the advantage of being able to perform exceptionally well even after considerable poisoning with poisons such as hydrogen sulfide or sulfur containing hydrocarbons.

The novel catalysts of the present invention comprise a mixture of an alkali metal salt, preferably a potassium salt and particularly a potassium halide salt and especially potassium chloride, with a vanadium oxide precursor and are preferably supported on supports such as inorganic oxides including but not restricted to: alumina, silica, cordierite, other similar inorganic oxides or new high temperature organic supports.

Applicants have also found that the addition of water to the feed stream in an amount below the supersaturation point at the given temperature and pressure of the feed stream, is capable of effectively shifting the equilibrium concentration of chlorine gas produced during oxidation to hydrochloric acid according to the Deacon reaction shown below:

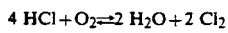

4 HCl + O$_2$ ⇌ 2 H$_2$O + 2 Cl$_2$

The novel catalytic composition such as potassium chloride/vanadium oxide (KCl/V$_2$O$_5$) can easily be a coating on the inorganic support to form a supported catalyst. The catalytic coating shows excellent, selective, low temperature conversion of chlorinated hydrocarbons with high resistance to sulfur-containing poisons, into non-noxious products such as hydrochloric acid (HCl) and carbon dioxide (CO$_2$) with low selectivity to phosgene (COCl$_2$), a worrisome by-product of the thermal destruction of halogenated hydrocarbons. By the addition of water vapor below the supersaturation point for the feed stream, the formation of chlorine gas products can be suppressed.

The preferred composition of the catalyst is a mixture of an alkali metal salt such as potassium chloride and a vanadium oxide precursor such as ammonium metavanadate in a molar ratio range of 1:0.5 to 1:5, particularly preferred molar ratio from about 1:0.6 to about 1 3, and especially preferred molar ratio from about 1:0.75 to about 1:1.25. These catalysts can be deposited onto suitable inorganic supports including but not limited to silica, alumina, cordierite, other similar inorganic supports and high temperature organic supports from aqueous solutions of appropriate ratios of an alkali metal salt and a water soluble vanadium oxide precursor such as NH$_4$VO$_3$ (ammonium meta-vanadate). The solution is allowed to fully saturate the support. The saturated support is then slowly dried at a temperature from about 100° C. to 160° C., preferably from about 120° C. to about 140° C. for a time sufficient to drive off the excess water from about ½ hour to about 1½ hours with 1 hour being preferred and then calcined to form the novel catalyst of this invention such as KCl/V$_2$O$_5$, at a temperature from about 300° C.–600° C. and preferably from about 450° C.–525° C. and for a time sufficient to decompose the ammonium meta-vanadate to vanadium oxide from about 6 hours to about 48 hours with 12 hours being preferred.

The preferred temperature range for carrying out deep oxidation of chlorinated hydrocarbons is between 400°–525° C.

Unsupported catalysts of the present invention can be manufactured by contacting an alkali metal salt with a vanadium oxide precursor, such as ammonium metavanadate, preferably in an aqueous medium in a molar ratio from about 1:0.5 to 1:5. The mixture is then thermally dried at a temperature from about 85° C. to 100° C. with stirring for a sufficient time to drive off excess water if the mixture is aqueous from about 2 hours to about 6 hours with 4 hours being preferred and calcined at temperatures from about 300° C.–600° C. for a sufficient time to decompose the ammonium meta-vanadate from about 6 hours to about 48 hours with 12 hours being preferred. These unsupported catalysts can be used in a gas-molten salt type reactor.

A second and preferable manufacturing process involves contacting an alkali metal salt with a vanadium oxide precursor preferably a water soluble vanadium oxide precursor such as ammonium meta-vanadate, preferably in an aqueous medium in a molar ratio from about 1:05 to 1:5 in the presence of an inorganic support which results in a deposition of the aqueous solution and thereby a deposition of the mixture of an alkali metal salt and the vanadium oxide precursor onto and into the support. The saturated support is then thermally dried slowly at a temperature from about to 100° C. to 160° C. and calcined at temperatures from about 300° C.–600° C. This preferred process for manufacturing the catalyst of this invention is designed to allow for complete and careful solution deposition of the catalyst onto an inorganic or high temperature organic support.

The process for destruction of chlorinated hydrocarbons involves contacting a chlorinated hydrocarbon with a catalyst of an alkali metal salt and an oxide of vanadium in a molar ratio from about 1:0.5 to 1:5 at a temperature from about 300° C. to 600° C., preferably at a temperature from about 400° C. to about 525° C., in any type of commercial reactor or furnace for a sufficient time to allow for oxidation from about 0.001 seconds to 5 seconds, preferably from about 0.04 to about 1 second.

The invention will be better understood by reference to the following examples:

EXAMPLE 1

Preparation of Catalyst—Method 1

In this example, vanadium type catalyst of the prevent invention was prepared by the incipient wetness method for deposition of a catalyst on the surface of an inorganic support.

A silica alumina monolith tube catalyst support having a length of 22.9 centimeters, an outside diameter of 1.6 centimeters, an internal diameter of 0.6 centimeters, and a low surface area of approximately 0.4 $m_2/g$ was heated to 200° C. for one hour to dehydrate the support after which the support was weighed. A solution of potassium chloride and ammonium meta-vanadate in a molar ratio of 1:1 was slowly added to the support in a roller chamber to ensure uniform coverage of the support surface. The tube was then slowly heated from 100° C. to 150° C. for an hour to drive off the water. The support coated with the catalyst components was then heated to 500° C. for twelve hours to decompose the ammonium meta-vanadate yielding the appropriate weight percent of a one to one mixture of a potassium chloride/vanadium oxide catalyst. After cooling, the catalyst support was weighed and the exact weight percent of potassium chloride/vanadium oxide catalyst was determined by the difference between the initial weight and the final weight of the support. The amount of potassium chloride and ammonium meta-vanadate dissolved in the solution used in the wetting technique was sufficient to render a catalyst with approximately 0.8 weight percent of the catalyst on the support surface.

EXAMPLE 2 Preparation of Catalyst—Method 2

In this example, vanadium type catalyst of the present invention is prepared by direct mixing and heating to form a solid, semi-solid or molten catalyst.

18.64 grams (0.25 mole) of potassium chloride and 29.245 grams (0.25 mole) of ammonium meta-vanadate are mixed together with 1000 ml of water. The slurry is stirred and slowly dewatered by heating at 90° C. Heating is continual until a thick paste results. The paste is transferred to a ceramic dish and dehydrated and deaminated at 500° C. The resulting mixed catalyst can be maintained in a solid, semi solid, semi molten, or molten state by adjusting the temperature. At higher temperatures, from about 500°-550° C., the mixed catalyst is in a molten or semi molten state, while at temperatures below 500° C. the catalyst is in a solid or semi solid state.

EXAMPLE 3

General Reaction Conditions

In this example, the general procedure for the oxidation of chlorinated hydrocarbons over a monolith with an impregnated potassium chloride-vanadium oxide catalyst was as follows:

The catalyst as described in Example 1 was placed in a fixed bed reactor with inlet lines, outlet lines and temperature control devices to maintain the temperature at any desired level. The monolithic catalyst was loaded into the catalyst chamber and the catalyst chamber was heated to the desired reaction temperature. Oxidation was carried out at 500° C. plus or minus one degree. The temperature was maintained by temperature controllers of standard type used in the art. Pressure was maintained at one atmosphere plus or minus one millimeter of mercury by standard techniques known in the art. The residence time of the material was set at 0.4 seconds plus or minus 0.01 seconds by standard methods known in the art. A flow rate of the air enriched chlorinated hydrocarbon streams was set at 500 cc per minute plus or minus 10 cc per minute by standard methods known in the art. The resulting oxidation products were analyzed by standard methods including GC, GC/MS and IR spectroscopy. This general technique and reactor conditions were used throughout the remaining experimental sections.

EXAMPLE 4

In this example, dichloromethane, chloroform and carbon tetrachloride were oxidized using a catalyst as described in Example 1 and under conditions described in Example 2.

The oxidation of the three chlorinated methanes described in the introduction to this example were performed at a series of different feed ratios. The feed ratio was defined as the number of carbon-chlorine bonds divided by the number of chlorine carbon bonds plus the number of hydrogens in the feed. Thus, a pure dichloromethane feed has a feed ratio of 0.5; while a pure chloroform feed has a feed ratio of 0.75; and a pure carbon tetrachloride feed has a feed ratio of 1. The feed ratios of the parent materials (0.5 for dichloromethane, 0.75 for chloroform, and 1 for carbon tetrachloride) were reduced by the addition of water to the feed stream. The amount of water was varied to attain any desired feed ratio. When the feed ratios were below about 0.1, the amount of water in the stream approached 100% relative humidity at ambient temperatures (the feed inlet temperature). 100% relative humidity in these experiments was consistent with approximately 20,000 ppm (ppm is used in this application to refer to parts per million by volume) water in the oxygen feed stream. The results of the oxidation of these three chlorinated methanes are shown in FIG. 1. Although there is some spread in the experimental results for each chlorinated methane in the absence of water i.e., under conditions where only the chlorinated hydrocarbon and air are present in the reactor system, the addition of water vapor in the feed decreased the percent conversion for the two partially chlorinated methanes (dichloromethane and chloroform), but actually increased the conversion of carbon tetrachloride. The major influence of the addition of water in the feed streams was the reduction of the amount of chlorine produced in the reaction and an increase in the amount of HCl. This was due to the effect water had on the equilibrium concentration of chlorine gas and hydrochloric acid as described by the Deacon reaction shown below:

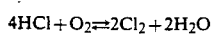

Thus, by the addition of water, applicants were able to control the production of chlorine gas, an undesirable by-product of oxidation of chlorinated hydrocarbons.

Product selectivities were as follows:

% Cl to HCl for carbon tetrachloride ranged from approximately 100% at a feed ratio between 0.1 and 0.2 to approximately 0% for a pure carbon tetrachloride feed; the decrease is nearly linear with increasing feed ratio;

% Cl to HCl for dichloromethane ranged from approximately 70% at a feed ratio of 0.1 to 40–50% for a pure dichloromethane feed, the decrease was non-linear with increasing feed ratio, dropping off faster at low feed ratio;

% Cl to HCl for chloroform were relatively constant at 20–25% over the entire feed ratio range;

% C to carbon dioxide for carbon tetrachloride ranged between 95% and 80% over the center feed ratio range, decreasing only at the high feed ratios, i.e., near pure carbon tetrachloride feed ratios;

% C to carbon dioxide for dichloromethane ranged from about 80% at low feed ratios to approximately 50% for pure dichloromethane feeds;

% C to carbon dioxide for chloroform ranged from approximately 80% to approximately 70% over the feed ratio range with the higher conversion at low feed ratio volume.

EXAMPLE 5

In this example a mixed stream of dichloromethane and chloroform was oxidized.

Figure 2:
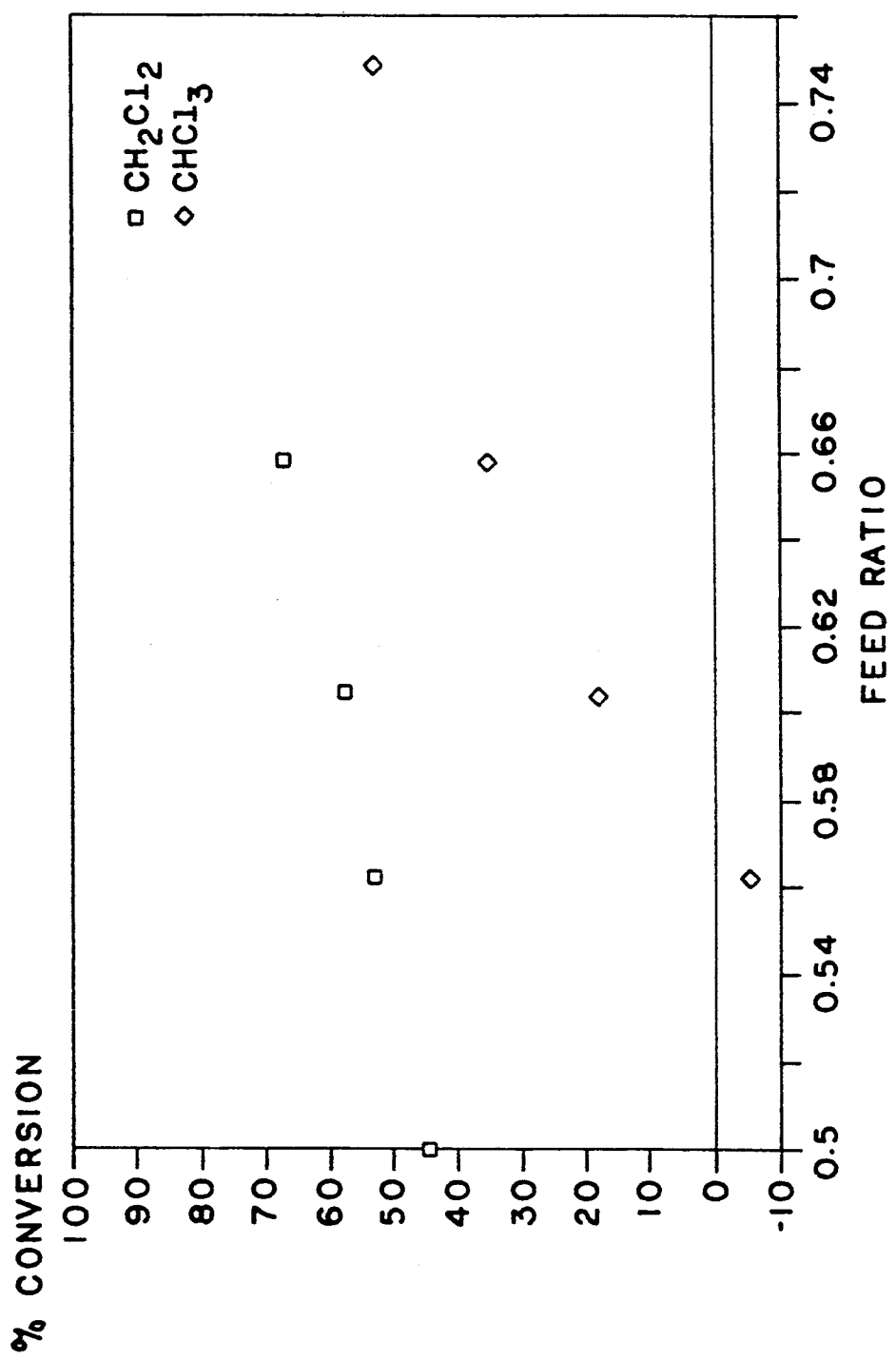
FIG. 2 represents the conversion profiles for a mixed feed of dichloromethane and chloroform versus feed ratio which varies from a pure dichloromethane feed to a pure chloroform feed. Markers are used to distinguish the data according to the legend in the figure.

A set of experiments were performed in which a mixed stream of dichloromethane and chloroform were oxidized over a catalyst as described in Example 1 under conditions described in Example 2 to simulate a mixed stream of volatile chlorinated hydrocarbons. The conversion results for this mixture were plotted against feed ratios that go from 0.5 (which represented a pure dichloromethane feed) to 0.75 (which represented a pure chloroform feed). Again the feed ratio represented the number of carbon chlorine bonds divided by the number of carbon chlorine bonds plus the number of hydrogens in the feed stream going into the reactor. The extent of oxidative destruction of chloroform was effected in an adverse fashion by the presence of dichloromethane (see FIG. 2). However, the extent of oxidation of dichloromethane was not affected to any great extent by the presence of chloroform.

EXAMPLE 6

In this example a set of experiments were performed using dichloromethane as the feed and the residence time in the reactor was changed from approximately 0.2 seconds to slightly over 1 second.

Figure 3:
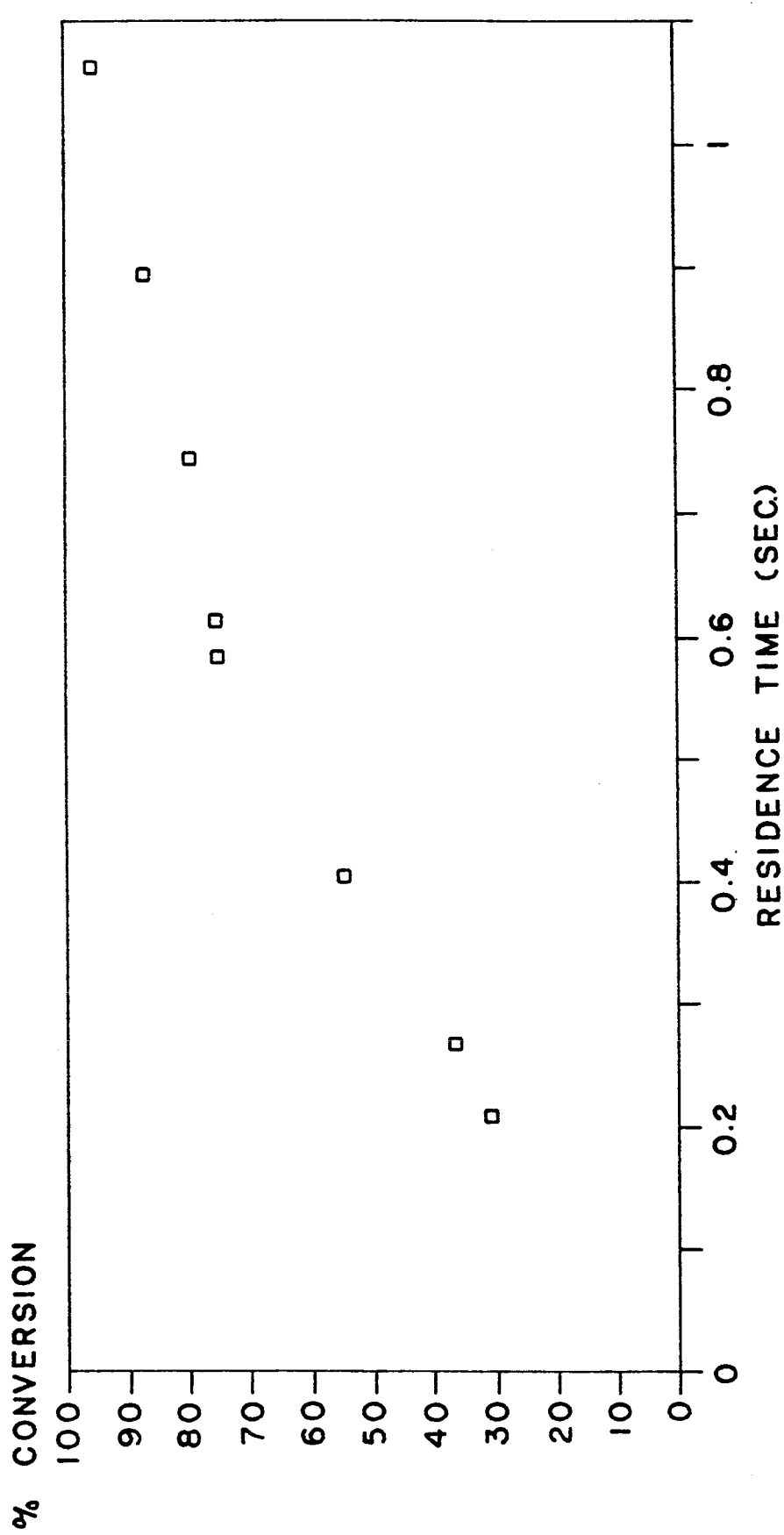
FIG. 3 represents the conversion profile of dichloromethane versus residence time in the reactor.

Dichloromethane was oxidized under the conditions described in Example 2 using the catalyst described in Example 1 were over a range of residence times from about 0.2 seconds to slightly over 1 second. The conversion profiles that were obtained for the different residence times are shown in FIG. 3. It is apparent from the results shown in FIG. 3 that the conversion of dichloromethane increased with increasing residence time. In fact, a residence time of 0.2 second resulted in a conversion of 30%, while the percent conversion was upwards of 95% for a residence time of about 1 second. Because of the complex nature of oxidation of chlorinated hydrocarbons, the oxidation of dichloromethane resulted in the formation of hydrocarbons containing more chlorine atoms, such as $CHCl_3$ and $CCl_4$ as well as higher molecular weight chlorinated hydrocarbons such as chlorinated ethane. Thus, some of the consumption of dichloromethane was due to the formation of chloroform, carbon tetrachloride, and higher molecular weight chlorinated hydrocarbons. However, the conversions to carbon dioxide and hydrochloric acid were normally above 50% for these runs and increased with the higher residence time in the reactor.

Product selectivity:

% Cl to HCl remained between 40–50% over the entire range of residence times listed; and % C to $CO_2$ increased with increasing residence times ranging from about 45% at 0.2 seconds to approximately 70% at near 2 seconds residence time with the increase being nearly linear.

EXAMPLE 7

This example consists of a set of examples where dichloromethane was used for benchmark runs during the course of all the experimental work done on the catalyst of Example 1 under the conditions of Example 2 to determine the long-term performance of the catalytic preparation.

Figure 4:
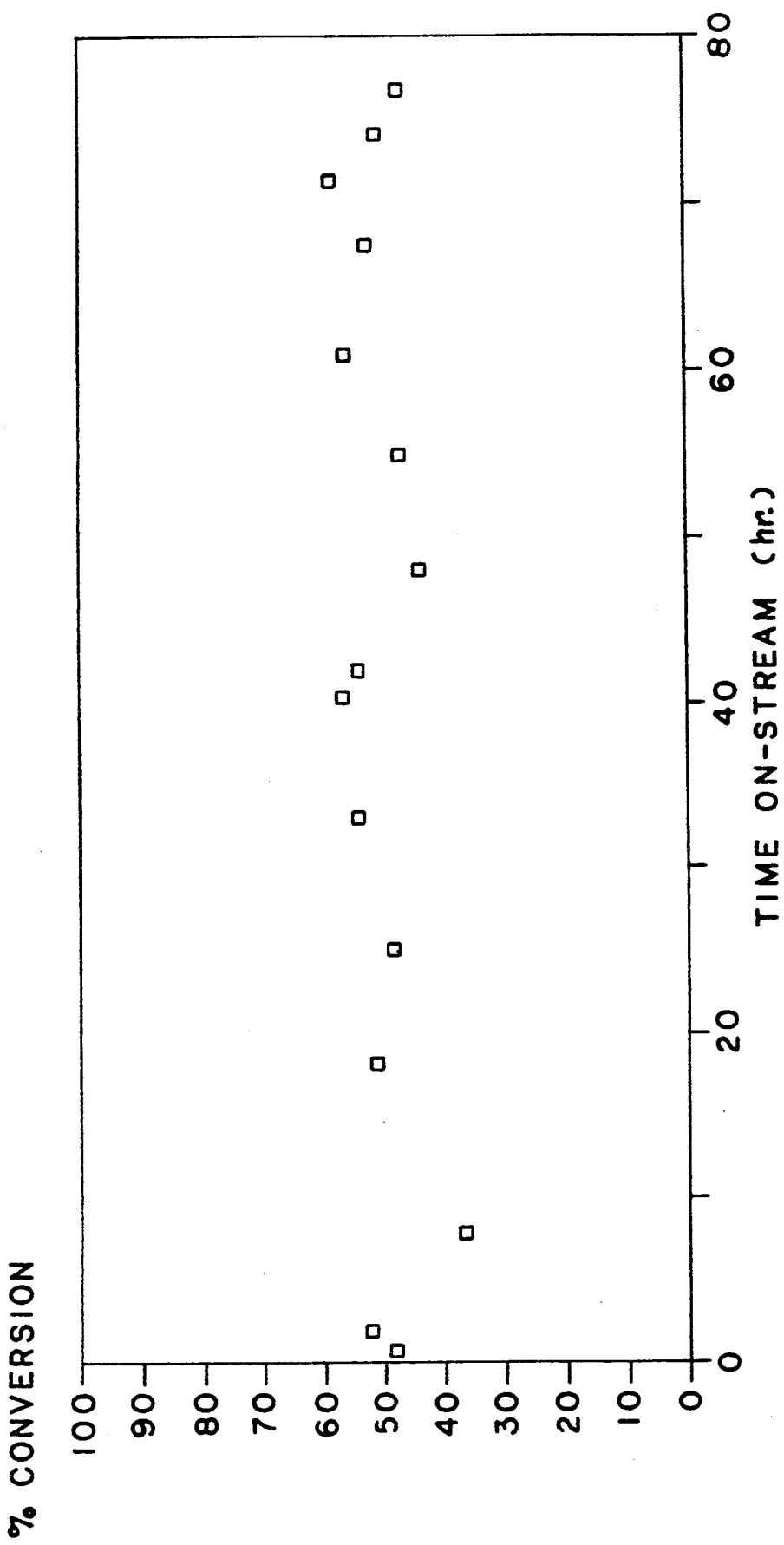
FIG. 4 represents the conversion profile of dichloromethane versus time of stream of the catalyst.

A set of experimental runs were performed as benchmarks to determine long term catalyst stability and activity. These reactions consisted of the oxidation of dichloromethane using the catalyst as described in Experiment 1 and under the conditions as described in Experiment 3. The conversion results obtained over a period of approximately 80 hours of on-stream time for the oxidation of dichloromethane over a catalyst is as shown in FIG. 4. It is apparent from these results that the conversion was essentially constant with time on-stream for at least the 80 hours of continuous on-stream time that this catalyst endured. Thus, the deactivation of this catalyst did not seem to be a rapid process nor was there any indication that the time on stream with the chlorinated hydrocarbons deleteriously affected the catalyst performance.

EXAMPLE 8

In this example dichloromethane was oxidized in the presence of 3,500 ppm of hydrogen sulfide.

A set of experiments based on the oxidation of dichloromethane over a catalyst as described in Experiment 1 and under conditions as described in Experiment 3 were performed in the presence of 3,500 PPM of hydrogen sulfide. A set of comparative experiments were also performed on a chromia catalyst on an identical monolithic catalyst support under the identical conditions as described in Example 2, as described in Example 1 with the inclusion of the 3,500 ppm hydrogen sulfide. Hydrogen sulfide was felt to represent a major potential poison for catalysts designed to oxidize chlorinated hydrocarbons. The comparative catalyst, chromium oxide, before the beginning of the addition of hydrogen sulfide showed a 65.7% conversion of dichloromethane, a selectivity to chloroform of 12%, a selectivity to carbon tetrachloride of 1%, selectivity to hydrochloric acid of 33%, a selectivity to phosgene of 0% and a selectivity to carbon dioxide of 49.7%. The vanadium catalyst of this invention under the same conditions, showed a conversion of dichloromethane of 59.7%, a selectivity to chloroform of 25.2%, a selectivity to carbon tetrachloride of 7.5%, a selectivity to hydrochloric acid of 29.6%, a selectivity to phosgene of 0.4%, and selectivity to carbon dioxide of 20.5%. After two hours of running in the presence of 3,500 ppm of hydrogen sulfide, the chromium oxide catalyst showed a conversion of 47.8%, a selectivity to chloroform of 5.1%, a selectivity to carbon tetrachloride of 0.5%, a selectivity to hydrochloric acid of 64.5%, a selectivity to phosgene of 3.1% and a selectivity to carbon dioxide of 16.6%. The vanadium catalyst of the present invention showed a conversion of 60.5%, a selectivity to chloroform of 11%, a selectivity to carbon tetrachloride of 1.7%, a selectivity to hydrochloric acid of 32.3%, a selectivity to phosgene of 0.5%, and a selectivity to carbon dioxide of 18.0%. After 10 hours of oxidation in the presence of three 3,500 ppm of hydrogen sulfide, the chromium catalyst showed a conversion of 56.4%, a selectivity to chloroform of 8.5%, a selectivity to carbon tetrachloride of 0.8%, selectivity to hydrochloric acid of 38.4%, selectivity to phosgene of 1.2%, and a selectivity to carbon dioxide of 16.1%. The vanadium catalyst of the present invention showed a conversion of 62.3%, a selectivity to chloroform of 6.5%, a selectivity to carbon tetrachloride of 0.6%, selectivity to hydrochloric acid of 20%, a selectivity to phosgene of 1.5%, and a selectivity to carbon dioxide of 35.0%.

It is apparent from these data that the vanadium catalyst of the present invention increased its activity with the extent of time on-stream in the presence of 3,500 ppm hydrogen sulfide, while the chromium catalyst decreased its activity, though not in a standard and understandable manner.

Secondly, the selectivity to higher chlorinated species such as chloroform and carbon tetrachloride, decreased with the amount of hydrogen sulfide added and the extent of production of carbon dioxide increased for the vanadium catalyst of the present invention with time on-stream in the presence of 3,500 ppm hydrogen sulfide. Thus, the vanadium catalyst as described in this invention was capable of a high degree of performance with streams that contain sulfur type poisons including hydrogen sulfide with no deleterious affect on conversion. In fact, there was a slight enhancement of conversion, and only minor shifts in product distributions with the suppression of the amount of higher chlorinated analogs of methane being observed.

The preceeding examples which deal with the oxidation of chlorinated hydrocarbons over the vanadium catalysts of the present invention were performed under relatively low conversion so as to allow kinetic data to be determined. It should be realized that a person of ordinary skill in the art could adjust process variables such as temperature, flow rate, air content, etc. or increase the catalyst support surface area in the case of supported catalysts of this invention, to achieve much higher conversion.

What is claimed is:

1. A catalyst composition for the oxidation of chlorinated hydrocarbons consisting essentially of a mixture of potassium halide metal salt and an oxide of vanadium characterized by resistance to sulfur poisoning and resistant to vanadium in a chlorine-rich environment.

2. A catalyst according to claim 1, wherein the potassium halide metal salt is potassium chloride.

3. A catalyst according to claim 1, wherein the molar ratio of an alkali metal salt to an oxide of vanadium is from 1:0.5 to 1:5.

4. A catalyst according to claim 3, wherein the molar ratio is from 1:0.75 to 1:1.25.

5. A catalyst according to claim 1, wherein said catalyst is deposited on a support.

6. A catalyst according to claim 5, wherein said support is an inorganic support selected from the group consisting of silica, alumina, silicates, silica alumina, cordierite or mixtures thereof.

7. A process for the preparation of a catalyst for the oxidation of chlorinated hydrocarbons comprising the steps of contacting a potassium halide metal slat and a vanadium oxide precursor in a molar ratio from 1:0.5 to 1:5, heating the mixture at a temperature from 85° C. -100° C. and calcining the mixture at a temperature from 300° C. to 600° C. for a time sufficient to decompose the vanadium oxide precursor.

8. A process according to claim 7, wherein the potassium halide metal salt is potassium chloride.

9. A process according to claim 7, wherein the molar ratio of an alkali metal salt to an oxide of vanadium is from 1:06 to 1.3.

10. A process according to claim 9, wherein the molar ratio is from 1:0.75 to 1:1.25.

11. A process according to claim 7, wherein said calcining is from about 450° C. to 525° C.

12. A process for the preparation of catalyst for the oxidation of chlorinated hydrocarbons comprising the steps of contacting an aqueous mixture of potassium metal halide salt and a water soluble vanadium oxide precursor in a molar ratio from 1:0.5 to 1:5 in the presence of a support, heating the support containing mixture at a temperature from about 100° C.–160° C. for a time sufficient to drive off the water from about ½ hour to about 1½ hours and calcining the mixture at a temperature for about 300° C. to 600° C. for a time sufficient to decompose the vanadium oxide precursor from about 6 hours to about 48 hours.

13. A process according to claim 12, wherein the potassium metal halide salt is potassium chloride.

14. A process according to claim 13, wherein the molar ratio is from 1:0.75 to 1:1.25.

15. A process according to claim 12, wherein said heating is from about 120° C. to 140° C.

16. A process according to claim 12, wherein said calcining is from about 450° C. to 525° C.

* * * * *

UNITED STATES PATENT AND TRADEMARK OFFICE
CERTIFICATE OF CORRECTION

PATENT NO. : 5,075,273

DATED : December 24, 1991

INVENTOR(S) : Greene, et al

It is certified that error appears in the above-identified patent and that said Letters Patent is hereby corrected as shown below:

Title page, item [54], and col. 1, lines 1-3 should read --CATALYST FOR DESTRUCTION OF HAZARDOUS CHLORINATED WASTES AND PROCESS FOR PREPARING THE CATALYST.

Signed and Sealed this

Thirtieth Day of March, 1993

*Attest:*

STEPHEN G. KUNIN

*Attesting Officer*     Acting Commissioner of Patents and Trademarks